United States Patent [19]

Bergna

[11] 4,316,744
[45] Feb. 23, 1982

[54] HIGH RATIO SILICATE FOUNDRY SAND BINDERS

[75] Inventor: Horacio E. Bergna, Wilmington, Del.

[73] Assignee: E. I. Du Pont de Nemours and Company, Wilmington, Del.

[21] Appl. No.: 197,747

[22] Filed: Oct. 16, 1980

Related U.S. Application Data

[60] Division of Ser. No. 27,024, Apr. 4, 1979, which is a continuation-in-part of Ser. No. 670,076, Mar. 24, 1976, Pat. No. 4,162,238, which is a continuation-in-part of Ser. No. 448,689, Mar. 6, 1974, abandoned, which is a continuation-in-part of Ser. No. 380,124, Jul. 17, 1973, abandoned.

[51] Int. Cl.$^3$ .................................................. B28B 7/34
[52] U.S. Cl. ............................... 106/38.35; 106/38.5 R; 106/38.8; 106/81; 106/83; 106/197 C; 260/17 R; 260/28.5 AS; 260/29.6 S; 260/42.13
[58] Field of Search ............... 106/38.3, 38.35, 74, 106/84, 38.8; 164/16, 43; 260/29.6 S, 28.5 AS, 42.11, 42.13, 17 R, 38.5 R, 81, 83, 197 C

[56] References Cited

U.S. PATENT DOCUMENTS

| | | | |
|---|---|---|---|
| 2,093,454 | 9/1937 | Kistler | 106/163 R |
| 2,574,902 | 11/1951 | Bechtold et al. | 252/313 |
| 2,701,902 | 2/1955 | Strachan | 22/196 |
| 2,842,444 | 7/1958 | Emblem et al. | 106/38.3 |
| 2,975,494 | 3/1961 | Cooper | 22/193 |
| 3,492,137 | 1/1970 | Iler | 106/74 |
| 3,625,722 | 12/1971 | von Freyhold | 106/74 |
| 3,642,503 | 2/1972 | Beaney | 106/38.3 |
| 3,712,941 | 1/1973 | Myers | 106/74 |
| 3,715,224 | 2/1973 | Campbell | 106/74 |
| 3,752,680 | 8/1973 | Moore | 106/38.35 |
| 3,852,085 | 12/1974 | Vurlicer | 106/193 R |
| 3,920,578 | 11/1975 | Yates | 106/38.3 |

*Primary Examiner*—Lorenzo B. Hayes

[57] ABSTRACT

Binder solution for preparing sand cores of initial high strength but with essentially no strength after casting metals above 700° C., said binder solution comprising an aqueous solution of sodium, potassium or lithium silicate having an overall molar ratio of $SiO_2$/alkali metal oxide from 3.5:1 to 10:1, and containing sufficient amorphous silica so that the fraction of the total silica in the binder solution which is present as amorphous silica is from 2 to 75%, the amorphous silica having a particle size in the range from about 2 nanometers to 500 nanometers.

9 Claims, No Drawings

HIGH RATIO SILICATE FOUNDRY SAND BINDERS

CROSS-REFERENCE TO RELATED APPLICATIONS

This application is a division of copending application Ser. No. 027,024, filed Apr. 4, 1979, which is a continuation-in-part of application Ser. No. 670,076, filed Mar. 24, 1976, now issued as U.S. Pat. No. 4,162,238 which is a continuation-in-part of application Ser. No. 448,689, filed Mar. 6, 1974, now abandoned, which is a continuation-in-part of application Ser. No. 380,124, filed July 17, 1973, now abandoned.

BACKGROUND OF THE INVENTION

In the metal casting industry molten metal is cast into molds containing sand cores made from foundry sand and binders. These sand cores are conventionally bonded with organic resins which, during curing and during casting of the metal, decompose and evolve byproducts which are odoriferous, offensive fumes which are not only skin irritants but in most cases toxic. The molds themselves are made from foundry sand bonded with oils, clays and/or organic resins. Thus, during their use, similar problems can occur.

A great percentage of the sand binders used by the foundry industry are made of phenol- and urea-formaldehyde resins, phenolic- and oil-isocyanate resins, and furan resins. Almost all of these binders and their decomposition products such as ketones, aldehydes and ammonia are toxic. The principal effect on man is dermatitis which occurs not so much from completely polymerized resins, but rather from the excess of free phenol, free formaldehyde, alcohol or hexamethylenetetramine used as a catalyst. Formaldehyde has an irritating effect on the eyes, mucous membrane and skin. It has a pungent and suffocating odor and numerous cases of dermatitis have been reported among workers handling it. Phenol is a well-known poison and is not only a skin irritant but is a local anesthetic as well, so that burns may not be felt until serious damage has been done. Besides being capable of causing dermatitis it can do organic damage to the body. Furfuryl alcohol defats the skin and contact with it has to be avoided. Hexamethylenetetramine is a primary skin irritant which can cause dermatitis by direct action on the skin at the site of contact. Urea decomposes to carbon dioxide and ammonia, the latter of which is intolerable in toxic concentrations. In addition to the binders, some processes use flammable gases such as triethylamine as a curing agent. Capturing or destroying gases, smoke and objectionable odors are only temporary, stop-gap expensive solutions. New binders are needed that completely eliminate the sources of offensive odors and toxic gases.

Many of the organic binders are hot setting and therefore require heating to cure. Hot molds not only add hazards and complicate pollution control problems but add economical problems related to increased use of energy and increased equipment, maintenance and operation costs.

An alternative is to use inorganic cold setting binders, such as sodium silicate, which set at room temperature without producing objectionable gases or vapors. The use of silicates, however, results in the silicate bond remaining too strong after casting, so that the core is still coherent, and has to be removed by use of violent mechanical agitation or by dissolving the silicate bond with a strong, hot aqueous alkali. The problem may be lessened to a degree by using sodium silicate solutions admixed with organic materials such as sugar, but even in this case the core is still coherent after casting and requires extreme measures for removal such as violent mechanical agitation.

Thus, there is a need to create a binder for sand in making cores and molds for casting metals such as aluminum, bronze, or iron, that will have satisfactory high strength before the metal is cast, retain sufficient hot strength and dimensional stability during the hot metal pouring, but which will have such strength after the metal has been cast and cooled, that the sand can be readily shaken out of the cavities formed by the cores; the binder also should be one that will not evolve unreasonable amounts of objectional fumes when the sand cores and molds are subjected to molten metal.

SUMMARY OF THE INVENTION

I have discovered that molds and sand cores of initial high strength but with essentially no strength after casting metals above 700° C. can be made by bonding foundry sand with an aqueous solution of sodium, potassium, or lithium silicate or their mixtures and amorphous colloidal silica the amounts of silicate and amorphous colloidal silica being such that the overall molar ratio of $SiO_2$/alkali metal oxide ($M_2O$) is from 3.5:1 to 10:1, preferably 4:1 to 6:1, the fraction of the total silica present as amorphous colloidal silica is from 2 to 75% by weight, preferably 2 to 50%, and most preferably 10 to 50%, the amorphous colloidal silica having a particle size in the range from about 2 nanometers to 500 nanometers, and the 98 to 25% balance of the total silica being in the form of silicate ions. The percent solids of the aqueous binder solution being 20-55% by weight. The amorphous colloidal silica in the binder comprises both the amorphous colloidal silica component of the mixture and the amorphous colloidal silica fraction inherently present in aqueous solutions of alkali metal silicates of ratio more than about 2.5.

In alkali metal aqueous solutions containing more than 2.5 mols of $SiO_2$ per mole of $M_2O$, it is found by ultrafiltration, according to a procedure referred to herein as the Gore Procedure, that at the concentrations used in this invention part of the silica in solution is ionic and part of it is colloidal, the colloidal fraction being retained by the ultrafilter while the ionic silicate passes through. In the case of sodium silicate for example, concentrated commercial silicate solutions are available having a $SiO_2/Na_2O$ ratio as high as 3.8/1.0 and these concentrated solutions therefore contain a substantial proportion of the silica present in the colloidal state. The colloidal fraction consists of a range of sizes less than 5 nm diameter and down to near 1 nm, with a substantial amount of 2 or 3 nm diameter. These units are so small that solubility equilibrium is rapidly established so that if the solution is diluted with water the units pass into solution forming lower molecular weight ionic species.

The higher the ratio of concentrated aqueous solutions of alkali metal silicates the higher the colloidal silica content, but for each ratio the colloidal silica content decreases with dilution of the solution.

To prepare a binder having $SiO_2/M_2O$ ratio of 3.5 to 3.8 it is therefore not necessary to add any colloidal silica if an alkali metal silicate solution is used already in the ratio range. On the other hand, if an alkali metal silica solution with ratio lower than 3.5 is used, it is necessary to add at least some colloidal silica in the form of a sol to prepare our binder.

Silica aquasols (water dispersions of colloidal amorphous silica) containing only a small amount of alkali as a stabilizer are commercially available and are described in the preferred aspects of this invention.

In summary, binder compositions of our invention comprise (1) aqueous solutions of alkali metal oxide silicates with or without amorphous silica present therein and (2) amorphous colloidal silica, if the silicate does not have any amorphous silica present therein or if the level of amorphous silica in the silicate is not sufficient.

The core and mold compositions of the invention have the additional advantage in that they can be made cold-setting, i.e., heating to set the binder system is not necessary. Thus, they can be set with $CO_2$ or a suitable acid releasing curing agent.

Preferred for use in the compositions of the invention are binder wherein the alkali metal silicate is sodium silicate and at least 10% of the amorphous silica is obtained from a silica sol.

In preferred embodiments of the composition of the invention carbonaceous materials, and/or film forming resin adhesives are employed. These materials can add desirable properties with respect to shake-out and storage life. The employment of these optional, but preferred, materials is described in greater detail in the following paragraphs.

Thus, I have found sand core or mold compositions of foundry sand and binder wherein the composition consists essentially of 85–97 parts by weight of foundry sand and 3–15 parts by weight of an aqueous binder comprising an aqueous sodium, potassium or lithium silicate solution or mixtures thereof with 20–55% solids content and amorphous silica, the amorphous silica in the silicate solution determined by the Gore test procedure, the binder characterized by (1) a molar ratio of silica to alkali metal oxide of from 3.5:1 to 10:1; (2) a weight fraction of the total silica present as amorphous silica is from 2 to 75%; and (3) a weight fraction of the total silica present as silicate ions is from 98 to 25% and the amorphous silica has a particle size of from 2 nanometers to 500 nanometers and the sand core or mold possesses a compressive strength sufficiently low to permit easy crushing after said core or mold is used in preparing a metal casting.

Accordingly, the present invention also includes a method for making a sand core or a sand mold useful in the casting of molten metal which comprises mixing 85 to 97 parts by weight of foundry sand with 3 to 15 parts by weight of a binder which comprises an aqueous sodium, potassium or lithium silicate solution or mixtures thereof with 20–55% solids content with amorphous silica having a particle size of from 2 nanometers to 500 nanometers, the amount of silicate and amorphous silica being adjusted to form a binder with (1) a molar ratio of silica to alkali metal oxide ranging from 3.5:1 to 10:1; (2) the weight fraction of total silica present as amorphous silica of from 2–75%; and (3) a weight fraction of the total silica present as silicate ions of from 98-25%; the amorphous silica present in the silica solution is determined by the Gore test procedure, forming the sand and binder mixtures into the desired shape and setting the formed mixture.

DESCRIPTION OF THE INVENTION

Foundry Sand

The compositions of the invention will contain between 85 and 97 parts by weight of foundry sand, preferably between 90 and 96 parts by weight. The amount of binder used is related to sand type and particle size in that with small sand particles and more angular surfaces, more binder mixture will be necessary.

The type of foundry sand used is not critical and the useful foundry sands include all of the ones conventionally used in the metal casting industry. Thus, these sands can be zircon sands (zirconium silicates), silica sands, e.g., quartz, aluminum silicate, chromite, olivine, staurolite and their mixtures.

The particle size of the foundry sand again is not critical and American Foundrymen's Society (AFS) particle sizes of 25 to 275 GFN can be employed. GFN stands for Grain Fineness Number and is approximately the number of meshes per inch of that sieve which would just pass the sample if its grains were of uniform size, i.e., the average of the sizes of grains in the sample. It is approximately proportional to the surface area per unit weight of sand exclusive of clay.

The useful sands can be washed sands or they can be unwashed sands and contain small amount of impurities, i.e., clay. If recycle sands are used, an adjustment may have to be made to the binder mixture to take into account any silicate present in such sands.

Various minerals can be used as sand additives to optimize mold or core performance. For instance, alumina or clay powders can be used to improve the high temperature strength and shake-out characteristics of the sand cores.

Conventional refractory grain alumina powders, kaolin, and Western bentonite can be used. Kaolin is preferred in amounts between 0.5 to 10% by weight of the sand. An example of a kaolin grade useful for this purpose is Freeport Kaolin Co.'s "Nusheen" unpulverized kaolin material which consists of kaolinite particles with a specific surface area of about 16 $m^2/g$.

Binder System

The compositions of the invention contain 3 to 15 parts, per 100 parts of sand binder mixture by weight, of a binder system comprising a water soluble alkali metal silicate, amorphous colloidal silica and water. The key is to have very finely divided amorphous silica particles of colloidal size dispersed within the alkali metal silicate bond. It is inherent in the nature of water soluble alkali metal silicates having a molar ratio $SiO_2$/alkali metal oxide ($M_2O$) above about 2.5, that colloidal silica is present. In the case of silicates having a ratio higher than 3.5, the colloidal silica content is such that they may be employed without adding more colloidal silica, but in the case of alkali metal silicates of lower silica-/alkali metal oxide ratio there is little or no amorphous colloidal silica present so that amorphous colloidal silica must be added in order to produce the cores and molds of the present invention.

In order for the foundry core or mold to become weak after heating and cooling, it is helpful to have crystalline silica such as cristobalite formed throughout the binder mass by spontaneous nucleation at high temperatures. Such nucleation apparently occurs at the surface of particles of amorphous colloidal silica. Hence, the larger the area of such surface, the weaker the resulting core after heating and cooling. If enough amorphous silica is colloidally subdivided and dispersed within the silicate, then within one gram of such silicate binder there can exist dozens of square meters of amorphous silica surface. The smaller the particles, the more rapid the loss of core strength after heating at 700° C. and cooling.

The useful water soluble silicate component of the mixture includes the commercially available sodium, potassium or lithium silicate or their mixtures. Sodium silicate is preferred. These silicates are usually used as solutions; however, their hydrates can be used provided that water is mixed into the binder, either prior to or during application to the sand. The useful sodium silicate aqueous solutions have a weight ratio of silica to sodium oxide ranging from 1.9:1 to 3.75:1 and a concentration of silica and sodium oxide of about 30 to 50% by weight. As stated above, a fraction of the silica in the useful water soluble sodium silicate of $SiO_2/M_2O$ ratio higher than 2.5 is in the form of very small particle size amorphous colloidal silicate. Alkali metal silicates with $SiO_2$/alkali metal oxide ratio higher than about 3.5:1 are referred to as high ratio alkali silicates or alkali polysilicates although they contain in fact a certain proportion of colloidal silica. In essence high ratio alkali metal silicate aqueous solutions can be conceived as mixtures of alkali metal ions, silicate ions and colloidal silica. High ratio alkali metal silicate solutions contain varying amounts of monomeric silicate ions, polysilicate ions and colloidal silica micelles or particles. The type, size of the ions and micelles or particles, and distribution depend for each alkali metal on ratio and concentration. Aqueous solutions of moderate concentration of the metasilicate ratio, namely $SiO_2$/alkali metal oxide 1:1, or more contain mainly the monomeric silicate ions. In disilicate aqueous solutions of moderate concentration, with $SiO_2/M_2O$ of 2/1 only the simple metasilicate and disilicate ions are present. Aqueous solutions of silicates with greater ratios contain monomeric silicate ions, dimeric silicate ions, and polymeric silicate ions (trimers, tetramers, pentamers, etc.)

The degree of polymerization of the silica in silicate solutions may be expressed as the number of silicate groups formed in the average molecule of silicic or polysilicic acid corresponding to the alkali metal silicate. The degree of polymerization increases with the ratio of the silicate. Whereas for example a sodium silicate solution of ratio 0.5:1 may have an average silica molecular weight of 60 corresponding to one molecule of $SiO_2$, sodium silicate solutions of ratio 1, 2, 3.5 and 4.0 are formed to have average molecular weights of about 70, 150, 325 and 400 respectively. This is the reason why as mentioned above high ratio silicates containing a large proportion of polymeric ions are also known as "polysilicates".

Silicate polymer ions with a corresponding silica molecular weight above about 600 are sufficiently large to be considered as very small silica particles and will hereinafter be referred to as colloidal silica or colloidal $SiO_2$. Colloidal particles are generally defined as particles with a particle size between about one nanometer and 500 to 1000 nanometer. This particle size range constitutes the colloidal range and is not limited by a sharply defined boundary.

Alkali metal silicates with an "average" silica molecular weight higher than around 200 to 300 have a fraction of their silicate ions present as polysilicate ions in the colloidal range. The higher the average molecular weight the higher the fraction of polysilicate ions in the colloidal range and the higher the molecular weight or particle size of polymer ions or particles in the colloidal range. For example, a sodium silicate solution ratio 3.35:1 may contain more than 2 or 3 and as much as 15 percent by weight of the total silicate or silica in the form of colloidal silica. Sodium silicate solutions ratios 3.75:1 and 5:9 may contain more than 8 or 10 and as much as 33 percent by weight of the total silica respectively in the form of polysilicate ions or colloidal silicate. Higher ratio sodium silicate solutions of various ratios eventually reach a state of equilibrium in which the colloidal silica fraction has a certain particle size distribution. In the case of sodium silicate aqueous solutions ratio 3.25 to 4 at equilibrium the colloidal silica fraction has a particle size smaller than 5 nm.

High ratio sodium silicate solutions may be prepared by simply adding dilute silica aquasols (colloidal dispersions of silica in water) to dilute low ratio sodium silicate solutions. In this case and until equilibrium is reached, average particle size of the colloidal silica fraction will be determined by time and silica particle size distribution of the original sol and the original silicate solution.

Increase in the ratio of alkali metal silicate solutions containing a constant concentration of silica causes an increase is viscosity even to the point of gelling or solidification. For this reason the maximum practical concentrations for alkali metal silicate solutions decrease with increasing ratio. Maximum practical concentration is the maximum concentration of $SiO_2$ plus $Na_2O$ in solution at which the silicate solution flows like a fluid by gravity and is stable to gelation for long periods of time. The following table illustrates as an example the case of sodium silicate aqueous solutions.

| Approximate $SiO_2/Na_2O$ Molar Ratio | Approximate Maximum Practical Concentration, % Wt. |
| --- | --- |
| 1.95 | 55 |
| 2.40 | 47 |
| 2.90 | 43 |
| 3.25 | 39 |
| 3.75 | 32 |
| 5.0 | <20 |

Above a certain concentration which decreases with increasing silica-soda ratio as explained above, sodium silicate aqueous solutions become very viscous and are stable for only a limited period of time. Stability in this case means resistance to gelling. More stable solutions can be made at lower sodium silicate concentrations but this may become impractical in a foundry binder. The high water content of very high ratio (more than 4 to 5) sodium silicate solutions at practical viscosities prevent their extended use as a foundry binder in the present invention. Excessively high water content in a foundry binder means unacceptably weak sand molds or cores and detrimental quantities of steam evolving when the molten metal is poured into the sand mold-core assembly.

Thus, the compositions of this invention involve percent solids in the aqueous binder of from 20–55%. Based on 3–15 parts by weight of binder in the composition of this invention this translates to 1.35–12% by weight water in the binder based on the final composition.

I have discovered ways of using high ratio alkali metal silicates as foundry sand binders without introducing excessive amounts of water into the sand and without employing unstable commodities.

A practical way of using high ratio silicate as binders for foundry sands is to mix concentrated silica aquasols and concentrated sodium silicate aqueous solutions in situ, that is on the surface of the sand grains, thus forming the high ratio silicate on the sand surface.

Concentrated sodium silicate aqueous solutions cannot be mixed with concentrated silica aquasols without almost immediate gelling. It would be very impractical or simply impossible to mix gels formed in this manner with sand using the means available today in common foundry practice.

However, I have discovered that effective mixing and binding effect is obtained with sand if the concentrated silica sol is mixed first with the sand to form a uniform and continuous film on the surface of the sand grains. The concentrated sodium silicate solution is then added to the sand mass in a second, separate step and the sodium silicate then mixed with the colloidal silica film on the surface of the sand, gelling in situ to form an intimately and uniformly mixed binder within the sand mass. The sand mix thus formed in the mixer can be molded by any of the various processes available in foundry practice and hardened to form strong molds or cores.

When sand molds or cores made with low ratio (less than about 3.5) silicate binders get dry either by exposure to a dry atmosphere or by heating, they become harder. On the other hand, when sand molds or cores made with very high ratio silicate as binders get dry either by exposure to a dry atmosphere or by heating they tend to become weak and friable. This is because the overall strength of the mold or core is primarily dependent on the mechanical properties of the solid film formed by the silicate adhesive when it sets. The separation of adhesive bonds is rarely the breaking away of the solid-liquid interface but more generally a rupture either within the adhesive film or within the body of the material to which the adhesive was applied. Cracks or other faults within the adhesive film are more likely to account for low bond strength than rupture at the interface.

The formation of crystalline silica within the mass of the binder contributes to weaken the bond between sand grains after heating and cooling the molds and/or cores, therefore, providing easier core shake-out and separation of the metal from the mold. Conventional sodium silicate binders form a glass on the surface of the sand grains when the molds or cores are heated to high temperatures. When the mold or core cools down to room temperature the glass becomes very rigid forming a very strong bond, therefore, hardening the mold or core. For this reason a core made with such a binder is very difficult to break up and remove from the cavity of a cast metal during the foundry operation known as shake-out.

When colloidal silica is embedded in a matrix of sodium silicate it tends to crystallize and form cristobalite at the temperatures the cores reach when metals are cast. Due to the difference in thermal expansion coefficient, the expansions and contractions of the cristobalite crystals embedded in the glass matrix tend to crack the binder film surrounding the sand grains therefore weakening the mold or core. This weakening effect has to be added to the already mentioned weakening effect due to the cracking of high ratio silicate films on dehydration. Due to these weakening mechanisms a core made with the high ratio silicates covered by this invention is very easy to break up and remove or separate from the cast metal during the shake-out operation.

Thus the difference in behavior between low and high ratio silicate binders for sand molds and cores can be understood by observing films formed on silica glass plates by slow evaporation of for example aqueous solutions of sodium silicate of various ratios.

The low silicate/soda ratio (2.0) sodium silicate solution dries in air at room temperature very slowly forming a very viscous, smooth, clear film. At higher ratio (2.4) drying is faster and the silicate film obtained shows some cracks. At very high ratios (3.25 and 4.0) sodium silicate solutions include substantial amounts of very small particle size colloidal silica and drying is even faster: cracking is even more extensive and the film tends to lose integrity. A silica sol of particle size 14 nm and $SiO_2/Na_2O$ ratio 90 does not form a continuous film under the same drying conditions.

Low ratio silicate binders thus form on the sand surface viscous, smooth films which do not form cracks on drying. On the other hand, the films formed on the sand surface by high ratio silicate binders, crack on drying thus weakening the sand core or mold. For these reasons cores made with low ratio silicate binders outside the scope of the present invention become stronger when they are heated at high temperatures by molten metals in the pouring operation of the casting process. On the other hand, cores made with high ratio silicate binders within the present invention are reasonably strong when just made, but become weak and friable during the casting operation.

In the practice of this invention a compromise has to be made when choosing a binder composition by selecting one with a $SiO_2/Na_2O$ ratio not so high that the sand molds or cores will weaken to unacceptable levels by merely drying at room temperature when exposed to the atmosphere, and not so low that the sand molds or cores will form a cohesive, solid glass bond when the core or mold is heated in the casting operation so that the core or mold becomes very strong when cooled down to room temperature and cannot be separated easily from the metal casting. The room temperature, as-made strength of sand molds or cores obtained with high ratio silicate binders of this invention may be upgraded by the addition to the silicate bonded sand mix of a fugitive film-forming resin adhesive in the form of a water solution or water dispersion. In this case, as explained below in more detail, the molds or cores become stronger by drying at room temperature. However, when heated to high temperatures during the casting process the resin adhesive decomposes evolving harmless vapors and the weakened core and mold can be easily separated from the cast metal.

If a preformed sodium polysilicate having a molar ratio of silica to alkali metal oxide in the range of 3.5 to 10 is employed before it gels, the same effects as with the amorphous silica sodium silicate system will be obtained. An aqueous sodium polysilicate containing 10 to 30% by weight silica and sodium oxide and having a silica to sodium oxide weight ratio of 4.2:1 to 6.0:1 can be produced as described in U.S. Pat. No. 3,492,137.

Similarly, the high ratio lithium silicates of Iler U.S. Pat. No. 2,668,149 or the potassium polysilicates of Woltersdorp, application Ser. No. 728,926, filed May 14, 1968, now Defensive Publication 728,926, dated Jan. 7, 1969, can be employed as the binder provided the requirements as to molar ratio, particle size and amount of amorphous silica are followed.

Furthermore, alkali metal polysilicates stabilized by quaternary ammonium compounds or guanidine and its salts can also be employed. Some stabilized polysilicates of this type are described in U.S. Pat. No. 3,625,722. This method, however, has the disadvantage of producing unpleasant odors on casting due to the thermal decomposition of the organic molecule.

Complexed metal ion stabilized alkali metal polysilicates can also be used, such as copper ethylenediamine hydroxide stabilized sodium polysilicate made by mixing copper ethylenediamine with colloidal silica and then the silicate, or the stabilized polysilicates of U.S. Pat. No. 3,715,224.

The useful amorphous silica are those having a particle size in the range from about 2 nanometers to 500 nanometers. In addition to the amorphous silica already present in aqueous solutions of high ratio alkali metal silicates, such silicas can be obtained from silica sol (colloidal dispersions of silica in liquids), colloidal silica powders, or submicron particles of silica. The silica sols and colloidal silica powders, particularly the sols, are preferred in view of the shake-out properties of the binders made from them.

Gore Procedure

The amount of colloidal silica present in an aqueous solution of high ratio alkali metal silicate can be determined for example by ultrafiltration. Ultrafiltration refers to the efficient selective retention of solutes by solvent flow through an anisotropic "skinned" membrane such as the Amicon "Diaflo" ultrafiltration membranes made by the Amicon Corporation of Lexington, Mass. In ultrafiltration solutes, colloids or particles of dimensions larger than the specified membrane "cut-off" are quantitatively retained in solution, while solutes smaller than the uniform minute skin pores pass unhindered with solvent through the supportive membrane substructure.

Amicon "Diaflo" ultrafiltration membrane offer a selection of macrosolute retentions ranging from 500 to 300,000 molecular weight as calibrated with globular macrosolutes. These values correspond to pore sizes between about 1 and 15 nm. Each membrane is characterized by its nominal cut-off, i.e., its ability to retain molecules larger than those of a given size.

For effective ultrafiltration, equipment must be optimized to promote the highest transmembrane flow and selectivity. A major problem which must be overcome is concentration polarization, the accumulation of a gradient of retained macrosolute above the membrane. The extent of polarization is determined by the macrosolute concentration and diffusivity, temperature effects on solution viscosity and system geometry. If left undisturbed, concentration polarization restricts solvent and solute transport through the membrane and can even alter membrane selectivity by forming a gel layer on the membrane surface—in effect, a secondary membrane—increasing rejection of normally permeating species.

An effective way of providing polarization control is the use of stirred cells. Magnetic stirring provides high ultrafiltration rates.

A recommended procedure is to use a Amicon ultrafilter Model 202, with a pressure cell of 200 ml capacity and a 62 mm diameter ultrafilter membrane operated at 25° C. with magnetic stirring with air pressure at around 50 psi.

In the case of sodium silicate for example, an aqueous solution diluted with water, is placed in the cell. An Amicon PM-10 membrane, 1.8 nm diameter pores, is used. Pressure is applied and filtrate collected. In some cases, water is fed in to replace the volume passing through the filter into the filtrate. The solution in the filter cell is concentrated until the filtration rate is only a few ml per hour.

The filtrate is collected in progressive fractions, and they and the final concentrated solution from the cell are examined: Volumes are noted and $SiO_2$ and $Na_2O$ concentrations in grams per ml are determined by chemical analysis.

In some cases, the concentrated solution on the filter is further washed by adding water under pressure, as fast as filtrate is removed. In these cases there is further depolymerization or dissolution of the colloid fraction.

The percentage of colloidal silica, based on total silica, is indicated by the amount of residual silica that does not pass through the filter. These represent maximum values for the amount of colloid present, since some ionic soluble silica is still present. In further examples the residual soluble silica is subtracted and the composition of the colloid is calculated.

It is not necessary to isolate the pure colloid, but only to measure the concentration of $SiO_2$ and $Na_2O$ as ultrafiltration proceeds. Since the concentration of "soluble" sodium silicate in the filtrate is about the same as in the solution in the cell if this colloid is present only at low concentration, the amount and composition of colloid can be calculated by difference.

Allowance should be made in interpreting results obtained with this method for the fact that evey time water is added to the system some depolymerization of colloid or polysilicate ions probably occurs.

The colloidal amorphous silicas useful in preparing the compositions of the invention have a specific surface area greater than 5 square meters per gram and generally in the range of 50 to 800 $m^2/g$ and preferably in the range of 50 to 250 $m^2/g$. The specific surface area is determined by nitrogen adsorption according to the BET method. The ultimate particle size of the silica used is in the colloidal range, and is generally in the range of 20 to 500 nanometers, preferably 12 to 60 nanometers. Thus, the silica sols of the desired particle size range described by M. F. Bechtold and O. E. Snyder in U.S. Pat. No. 2,574,902; J. M. Rule in U.S. Pat. No. 2,577,484; or G. B. Alexander in U.S. Pat. No. 2,750,345 can be used.

Positive silica sols and alumina modified silica sols wherein the ultimate silica particles have been modified and/or made electrically positive by partially or completely coating the particle surface with aluminum compounds can also be used in the present invention as a source of amorphous silica. Such sols are described for example by G. B. Alexander and G. H. Bolt in U.S. Pat. No. 3,007,878 and by G. B. Alexander and R. K. Iler in U.S. Pat. No. 2,892,797. The advantage of these sols is that in some cases they form more stable mixtures with sodium silicate aqueous solutions than the unmodified silica sols.

Certain very finely divided colloidal silica powders such as those made by the "fume process" by burning a mixture of silicon tetrachloride and methane, have a sufficiently discrete, particulate structure that such powders can be dispersed in water by colloid milling to give a sol useful in this invention. It is also obvious that such a powder can also be colloid milled directly into a solution of silicate.

Very finely divided colloidal silica powders can also be obtained by treating certain silicate minerals such as clay or calcium silicate with acid, followed by suitable heat treatment in an alkaline medium. Similarly, finely divided colloidal silicas can be produced by precipitating silica from a solution of sodium silicate with carbon dioxide. Such precipitated silicas are commonly used as reinforcing fillers, for elastomers because they are extremely finely divided, and the ultimate particles are easily broken apart. Finely divided aerogels of silicas may be employed, such as those described by Kistler in U.S. Pat. Nos. 2,093,454 and 2,249,767.

The finely divided colloidal silica powders useful in the composition of the invention are characterized by having specific surface areas as determined by nitrogen adsorption according to the BET method, of from 5 to 800 $m^2/g$ and preferably 50 to 250 $m^2/g$, and being further characterized by the fact that the aggregates of ultimate silica particles are generally less than 10 microns in diameter.

The amounts and types of amorphous silica that can be dispersed within the soluble silicate depends to a considerable extent on the amount of grinding or mixing that is done to disintegrate and disperse particles of amorphous silica in the silicate bond. Thus, for example, it is possible to start with fused silica glass and grind it to the point where a substantial amount is present as particles smaller than a micron. The inclusion of a high concentration of this type of material can provide sufficient surface for nucleation of cristobalite or tridymite within the alkali metal silicate glass bond when the sand core or mold reaches high temperature during the metal casting operation. Also, finely divided natural forms of silica such as volcanic glasses which, in the presence of alkali silicates, can be devitrified, may be used, providing they are sufficiently finely divided and well dispersed in the sodium, potassium or lithium silicate solution used as the binder.

The compositions of the invention will have 2 to 75% of the total silica present in the binder present as amorphous silica, preferably 10 to 50% the balance of the total silica being in the form of silicate ions. As the specific surface area of the amorphous silica increases, lesser amounts of it will be required in the binder mixture.

There is a practical maximum concentration of amorphous silica that can be dispersed in the aqueous silicate solution. It is often desirable to incorporate as high a concentration of amorphous silica as possible, yet still have a workable fluid binder to apply to the sand. If the proportion of amorphous silica to soluble silicate is too low, than the shake-out will be adversely affected. On the other hand, if the ratio of amorphous silica to soluble silicate is too high, the mixture will be too viscous and must be thinned with water. Also, there will not be enough binder to fill the spaces between the amorphous silica particles in the bond, and it will be weak. In generaly, the higher the content of amorphous silica relative to sodium or potassium silicate, the weaker the initial bond as set by carbon dioxide. Conversely, the more silicate in the binder, the higher will be the initial and retained strengths.

The binder system should have a molar ratio of silica to alkali metal oxide which ranges from 3.5 to 10, preferably 3.5 to 7. This ratio is significant because the ratios of soluble potassium, lithium or sodium silicates commercially available as solutions lie within a relatively narrow range. Most of sodium silicates are within the range of $SiO_2/Na_2O$ of about 2:1 to 3.75:1. Thus, overall ratios of binder compositions obtained by admixing colloidal silica, such as ratios of 4:1, 5:1, 7:1 are mainly an indication of what proportions of colloidal silica and soluble silicates were mixed since the amount of amorphous silica in the soluble silicate at ratios of 2:1 to 3.75:1 are small.

However, in the ratio range of about 3.5:1 to 4.0:1, compositions of a specified ratio are not necessarily equivalent. Thus, a potassium silicate having an $SiO_2/K_2O$ ratio of 3.9:1, in which there is a distribution of polysilicate ions, but relatively small amount of colloidal silica, differs considerably from a mixture made by mixing a potassium silicate solution of $SiO_2/K_2O$ of 2.0:1 with colloidal silica having a particle size of, for example, 14 nanometers. In the latter case, the colloidal particles will remain as such in solution over a considerable period of time. Such a composition has two advantages over the more homogeneous one in that the low ratio of silicate has a higher binding power giving greater initial strength, while the higher content of colloidal particles results in a major reduction in the strength in the core after casting the metal.

OPTIONAL ADDITIVES

In the casting of some metals, e.g., iron or steel, very high casting temperatures are involved, i.e., 2500° F. to 2900° F. If the mass of the core is small relative to the mass of the cast metal during such high temperature casting, there may be some vitrification of the silicate thus creating shake-out problems. To alleviate this situation a carbonaceous material can be added to the core composition. These carbonaceous materials assist the binder of the invention in providing excellent shake-out, particularly after the core has been subjected to very high temperatures.

The useful carbonaceous materials should have the following characteristics:

(a) It should not interfere with the binder system.

(b) It should have a particle size or primary aggregate equivalent diameter sufficiently large to leave discontinuities in the glass formed by the binder at very high temperatures, as it burns off partially or completely. It should also have a particle size which is not large enough to weaken the sand core as fabricated, and specially not larger than the particle size of the sand itself. Thus the particle size or primary aggregate equivalent diameter should range between 0.1 micron and 75 microns, preferably between 5 microns and 50 microns. When the ultimate particle size of the carbonaceous material is smaller than 0.1 micron it is generally coalesced or it tends to coalesce in the sand mix into primary aggregates larger than 0.1 micron.

(c) It should not be too avid for water, otherwise it would subtract from the binder system, drying up the sand and making it impossible or difficult to mold.

Preferred for use are pitch, tar, coal-tar pitch, pitch compounds, asphaltenes, carbon black, and sea coal, and most preferred are pitch and carbon black.

Pitch is a by-product from coke making and oil refining and is distilled off at around 350° F. It has a melting range of from 285° F. to 315° F., is highly volatile, high in carbon and extremely low in ash. Following is a typical analysis of coal-tar pitch in weight percent:

| | |
|---|---|
| Volatile | 47.37% |
| Fixed Carbon | 52.43 |
| Ash | 0.2 |
| Sulfur | 0.5 |

Pitch is a material resistant to moisture absorption and is often used as a binder or as an additive for foundry sand cores and molds.

Sea coal is a common name used to describe any ground coal employed as an additive to foundry sands. Sea coal is used in foundry sands primarily to prevent wetting of the sand grains by the molten metal, thus preventing burn-on and improving the surface finish of castings. It is also used as a stabilizer and to promote chilling of the metal.

Following is a typical analysis of sea coal given on a dry basis:

| | Weight Percent |
|---|---|
| Ash | 5.10% |
| Sulfur | 0.51 |
| Volatile carbonaceous material | 40.00 |
| Fixed Carbon | 53.80 |
| Ultimate analysis: | |
| Hydrogen | 5.20% |
| Carbon | 81.29 |
| Nitrogen | 1.50 |
| Oxygen | 6.40 |
| Sulfur | 0.51 |
| Ash | 5.00 |

Tar is generally defined as a thick, heavy, dark brown or black liquid obtained by the distillation of wood, coal, peat, petroleum and other organic materials. The chemical composition of a tar varies with the temperature at which it is recovered and raw material from which it is obtained.

Carbon blacks are a family of industrial carbons, essentially elemental carbon, produced either by partial combustion or thermal decomposition of liquid or gaseous hydrocarbons. They differ from commercial carbons such as cokes and charcoals by the fact that carbon blacks are particulate and are composed of spherical particles, quasigraphitic in structure and of colloidal dimensions. Many grades and types of carbon black are produced commercially ranging in ultimate particle size from less than 10 nanometers to 400 nanometers. In most grades ultimate particles are coalesced or fused into primary aggregates, which are the smallest dispersible unit of carbon black. The number of ultimate particles making up the primary aggregate gives rise to "structure"—the greater the number of particles per aggregate, the higher the structure of the carbon black.

When mixed with sand fine particle size carbon blacks are coalesced into aggregates in the sand mix, therefore they leave discontinuities in the binder phase when burned off during the high temperature casting operation.

An example of a commercial carbon black is Regal 660, sold by the Cabot Corporation of Boston, Mass., which has the following characteristics:

| | |
|---|---|
| Nigrometer Index: | 83 |
| Nitrogen Surface Area: | 112 m²/g |
| Oil (DBP) Absorption: | 62 cc/100 grams |
| Fixed Carbon: | 99% |

The carbonaceous material should be present in the core composition in the amount of 0.5 to 4 weight percent based on the foundry sand, preferably 1 to 2 weight percent.

The amount of carbonaceous material, e.g., pitch, needed depends, to some degree, on the refractoriness of the binder used which is in turn a function of the silica/alkali molar ratio, and on the temperature to which the core will be subjected during casting. When a $SiO_2/Na_2O$ ratio of 5:1 sodium polysilicate is used as a binder, no pitch is needed if the core is used for non-ferrous metal castings since in these cases the core temperature will not exceed about 1200° C. If the same binder is used for small cores in massive iron castings, 2% of pitch is useful to help break up the silicate glass formed.

In the event it is desirable to make cores and store them for extended periods of time prior to use, I have discovered that the addition of a film-forming resin adhesive in the form of a water solution or water dispersion, drastically extends the storage life of foundry sand cores made with the binder of the invention. Thus the use of these materials enable the formed cores to retain sufficient strength and hardness during storage.

Useful film-forming resin adhesives include polyvinyl esters and ethers and their copolymers and interpolymers with ethylene and vinyl monomers, acrylic resins and their copolymers, polyvinyl alcohol, water dispersions of polyolefin resins, polystyrene copolymers such as polystyrene butadiene, polyamide resins, natural rubber dispersions, and natural and modified carbohydrates (starch or carboxycellulose). Particularly preferred for use are aqueous dispersions of polyvinyl acetate and vinyl acetateethylene copolymers.

The polymer resin should be in a state of subdivision suitable for uniform distribution on the sand grains to form an adhesive film and hold the sand grains strongly together. It is preferred that resin dispersions be between 40 and 60% by weight solids. The higher the concentration of solids, the better, as less water will have to be removed, however, with concentrations above 60% by weight it can be difficult to mix the dispersion into the sand. With resin solutions, e.g., solutions of polyvinyl alcohol, concentrations of 4 to 20% solids are preferred.

Useful polyvinyl acetate dispersions are milk-white, high-solids dispersions of vinyl acetate homopolymer in water. Such dispersions have excellent mechanical and chemical stability. Typical properties of a preferred polyvinyl acetate dispersion are given in the following table. Commercially available dispersions with similar characteristics are Monsanto's S-55L, Borden's "Polyco" 11755, Air Products' "Vynac" XX-210, and Seydel Wooley's "Seycorez" C-79

TABLE

| TYPICAL PROPERTIES OF A PREFERRED POLYVINYL ACETATE HOMOPOLYMER AQUEOUS DISPERSION | |
|---|---|
| Solids, % | 55 |
| Brookfield viscosity, P* | 8.5–10 |
| pH | 4–6 |
| Molecular weight (number average) | 30,000–60,000 (mostly crosslinked) |

TABLE-continued
TYPICAL PROPERTIES OF A PREFERRED POLYVINYL ACETATE HOMOPOLYMER AQUEOUS DISPERSION

| | |
|---|---|
| Average particle size, microns | 1–2 (range from 0.1 to 4) |
| Density (25° C.), approx. lb./gal. | 9.2 |
| Surface tension (25° C.), approx. dynes/cm. | 55 |
| Min. film formation temperature** | |
| °C. | 17 |
| °F. | 63 |
| Residual monomer as vinyl acetate, % max. | 1.0 |
| Particle charge | essentially nonionic |

*Brookfield model LVF, No. 2 spindle at 6 rpm or No. 3
**ASTM D2354.

The useful vinyl acetate-ethylene copolymers are milk-white dispersions of 55 w/o solids in water with a viscosity between 12 and 45 poises. Du Pont's "Elvace" is a commercially available dispersion with these characteristics.

The useful polyvinyl alcohol (PVA) is a water soluble synthetic resin 85% to 99.8% hydrolyzed. Du Pont's "Elvanol" resins and Goshenol GL-05, 85% hydrolyzed, low viscosity PVA are examples of suitable commercially available materials. "Elvanol" grades give 4% water solutions with a viscosity ranging from 3.5 to 65 Cp at 20° C. as measured by the Hoeppler falling ball method. Water solutions of PVA at low concentrations (up to about 10–15 weight percent) or concentrated aqueous colloidal dispersions of the water insoluble polymer resins mix uniformly with sand and provide good adhesion. Very concentrated water solutions of PVA (higher than 20 weight percent) are too viscous and do not mix well enough with sand.

To obtain optimum adhesion, the film forming resin dispersion or solution should be added such that it does not gel or coagulate either the silica or the sodium silicate before adding them to the sand. For instance, the polymer resin dispersions can be mixed with the silica before adding to the sand because both are compatible and do not gel when mixed together. The mixtures can be added to sand and they will form an adhesive film on the surface of the sand grains. After the silica and the polymer resin dispersion have been mixed with the sand, the sodium silicate solution can be added to the sand and although it will thicken in contact with the silica and the polymer resin dispersion, it will do so in situ, that is, fairly uniformly distributed on a preformed film of silica and polymer resin.

If before adding to the sand the sodium silicate is mixed with the concentrated polymer dispersion and the silica, it thickens and gels and it cannot subsequently be mixed adequately with the sand. Instead of distributing fairly uniformly on the surface of the sand grains, it would tend to form lumps and distribute unevenly in the sand.

Alcoholic solutions of the polymer resins may be used but are not recommended as additives to the silica-sodium silicate binder because they get very thick in contact with the binder and tend to gel faster than the aqueous dispersions and therefore do not distribute as uniformly on the sand grains. However, dilute alcoholic solutions of polymer resins can be used as such or mixed with commercial zircon core washes to coat the surface of the cores and give improved hardness and storage life to the cores. In this case the gel forms on the surface of the sand core already set, and it air dries fairly fast or it is dried almost instantaneously by lighting the alcohol to extinction of the flame, therefore preventing the possible diffusion of the alcohol into the core.

The use of a water solution or water dispersion of a polymer resin produces sand cores with the silica-sodium silicate binder having as gassed mechanical strength somewhat lower than that of sand cores made with silica-sodium silicate binder without the polymer resin solution or dispersion. This may be due to the weakening of the sodium silicate bond caused by the dilution produced by the water of the polymer resin solution or dispersion. However, drying of the core on storage, more than overcomes this effect and after very few days the cores show a much higher mechanical strength than the one obtained immediately after gassing with $CO_2$.

Two mechanisms may contribute to the hardening and strengthening on storage provided by the polymer resin. One is the thickening in situ of the adhesive film of silica-polymer resin-sodium silicate on the sand grains due to the "salting-out" effect caused by electrolyte formation on gassing with $CO_2$. More important is the thickening and solidification of the film caused initially by the $CO_2$ blown through the sand grains and specially the subsequent evaporation of the water from the sand core on storage.

Under these conditions the polymer resin macromolecules and/or colloidal particles are expected to coalesce and form an effective adhesive bond between the sand grains and reinforce the sodium polysilicate binder.

In the case of the polyvinyl esters the alkaline hydrolysis caused by the mixing with the sodium silicate will tend to form in the already formed uniform film, polyvinyl alcohol, perhaps an even better adhesive than the ester itself.

The colloidal silica-resin, e.g., polyvinyl acetate components of the binder can be used in the form of a stable liquid mixture, the carbonaceous material being optionally present. Thus uniform mixtures containing colloidal silica and polyvinyl acetate within the relative amounts specified in this invention, such as 1.94 parts by weight of 40% aqueous colloidal silica and 2 parts by weight of 55% polyvinyl acetate aqueous dispersion, can be made by mixing the two components in a beaker. The mixture is stable and uniform and can be used within the working day. Overnight the mixture tends to separate in two layers and can be stirred up to make it uniform.

One method of providing a stable, pourable mixture of colloidal silica-polyvinyl acetate with or without the carbonaceous material, e.g., pitch, is to make the liquid phase slightly thixotropic but not viscous. In other words, to make it so that it sets to a weak gel structure at once when undisturbed (to maintain all particles in uniform suspension) but when stirred, or even tilted to pour, the yield point is so weak as to permit ready transfer of the material and easy blending with the sand.

Thixotropic suspensions with the characteristics described above can be prepared using a three component suspending agent system disclosed in U.S. Pat. No. 3,852,085, issued Dec. 3, 1974. This system consists of (a) carboxymethyl cellulose and (b) carboxyvinyl polymer in a total amount of about 36 to 65 weight percent with the relative amount of (a) to (b) varying from a weight percent ratio of about 1:4 to 4:1 and (c) magnesium montmorillonite clay in a concentration of about 35 to 64 weight percent.

The useful compositions will contain between 95 and 99½% by weight of the binder components and between ½ and 5% by weight of the suspending agent system. In a composition containing only the colloidal silica and resin, 15 to 35% of the binder will be silica solids and 15 to 35% of the binder will be resin solids. In a three component binder, 5 to 20% will be silica solids, 5 to 20% resin solids and 5 to 40% will be carbonaceous matter.

This suspension system can be used with dispersions containing a maximum solid content of 55 percent by weight of polymer resin and colloidal silica or polymer resin, colloidal silica and carbonaceous material such as pitch. The minimum solid content is only limited by the amount of water that is practical to add to the sand mix to obtain practical cores.

For example, to prepare a colloidal silica-polyvinyl acetate-pitch suspension 0.67 parts by weight of "Benaqua" (magnesium montmorillonite sold by the National Lead Co.) can be dispersed in 235 parts by weight of water with low shear mixing; 0.67 parts by weight of CMC-7H (carboxymethyl cellulose) and 0.67 parts by weight of Carbopol 941 (water soluble carboxyvinyl polymer) can be added and dissolved using low shear mixing; 0.15 parts by weight of a 1% solution of GE-60 (silicone-based emulsion) can be added as an antifoam agent; 194 parts by weight of "Ludox" HS-40 (aqueous colloidal silica dispersion sold by E. I. du Pont de Nemours & Co.) can be added and mixed with moderate shear mixing; 200 parts by weight of Gelva S-55L (polyvinyl acetate aqueous dispersion sold by the Monsanto Company) can be added and mixed with moderate shear mixing; then 200 parts by weight of "O" Pitch sold by the Ashland Chemical Company can be added and mixed with moderate shear mixing. A fluid suspension containing colloidal silica-polyvinyl acetate and pitch is obtained at a suitable ratio to be used as a component of the silicate binder system of the invention.

Alternatively, 58 parts by weight of water can be used instead of 235 parts by weight of water and in this case a uniform, stable suspension is obtained which is more viscous than the previously described, but still pourable and mixes well with sand.

Alternatively, pitch can be omitted from the preparation, and fluid suspensions containing colloidal silica-polyvinyl acetate are obtained at a suitable ratio to be used as components of the silicate binder system of the invention.

Application of the Binder

The binder mixture of the invention can be applied to the sand in various ways. Thus, if the binder mixture has sufficient shelf life, it can be formulated, stored, and applied to the sand when needed. The silicate and amorphous silica can be stored separately and then mixed together when needed and applied. Furthermore, they can be applied separately to the sand. If this latter procedure is used, it is preferred to first apply the amorphous silica, mix it into the sand, then apply the silicate and mix again. However, the silicate can be applied first.

Uniform sand mixes can be prepared by adding the binder to the sand in conventional foundry mixer, muller, or mix-mixers, or laboratory or kitchen mixers, and mixing for sufficient time to obtain a good admixture of the sand and binder, e.g., for several minutes. When added separately, it is desirable to mix each component for less than two minutes to avoid undue drying.

If an alkali metal polysilicate solution is used as a binder, it should be mixed directly with the sand. If on the other hand colloidal silica and sodium silicate solution are added separately to the sand, it is preferable to add the silica sol first and to mix it thoroughly with the sand before adding the sodium silicate. Once the sodium silicate is added, the mix should not be kept too long in the mixer. A period of two minutes stirring is generally optimum for the sodium silicate.

Dry colloidal silicas such as pyrogenic amorphous silica do not mix well with the sand and in addition they tend to absorb water from the sand-binder system. Therefore, dry colloidal silica powders should be added to the sand in the form of a paste made with water or water should be added to the sand to help mix the dry silica powder. The amount of water made to use the paste should be enough to assure good mixing of the silica powder and yet not too much to affect the strength of the core or mold when it is hardened. Generally the amount of water needed in this case is no more than around 3% by weight of sand.

When the film forming resin or pitch are incorporated into the core composition, if the components are added separately to the sand, the resin should be added to the sand before the silicate. The resin can be added to the sand before or after the colloidal silica. The order in which the pitch is added is not critical with respect to either the silica or the silicate.

When materials such as clays or oxides are used as additives besides the binder, they should be mixed thoroughly with the sand in the sand mixer before adding the binder.

In some cases it is found convenient to use a release agent mixed with the sand to prevent the core or mold from sticking to the core box or pattern after setting. In these cases a conventional core or mold release such as kerosene or Mabco Release Agent "G" supplied by the M. A. Bell Company of St. Louis, Mo., should be added to the sand mix in the last 20 seconds of the two minute period of mixing the sodium silicate.

If the sand mix is not going to be used immediately, it should not be allowed to dry or react with atmospheric $CO_2$. The mix should therefore be stored in a tightly closed container or plastic bag from where the air has been squeezed out before sealing until it is ready to be used. If a slightly hard layer forms on the top surface of the sand due to air left inside the container, the hard layer should be discarded before using the sand to make cores or molds.

A practical way of checking uniformity of the sand mix and observe changes in the sand mix, such as reaction with the atmospheric $CO_2$, is to add a few grams of an indicator such as phenolphthalein at the beginning of the mixing operation. The phenolphthalein can be added in the form of a fine powder before adding the sodium silicate or dissolved in the sodium silicate or in the silica sol. Usually 160 milligrams of phenolphthalein per kilogram of sand is sufficient to develop a deep pink color in the sand mix.

Conventional foundry practice can be followed to form and set the sand core or mold. The sand can be compacted by being rammed, squeezed or pressed into the core box either by hand or automatically, or can be blown into the core box with air under pressure.

The formed sand mix can be hardened very fast at room temperature by gassing the sand with $CO_2$ for a few seconds. Optimum gassing time can be determined either by measuring the hardness or the strength of the core or by observing the change of color of the sand mix when an indicator such as phenolphthalein has been previously added to the sand.

Thermal hardening can be used for cores made with the binder compositions of the invention instead of $CO_2$ hardening. For instance, high strength cores can be obtained in a very short time by forming the sand mix in a hot box at temperatures between 100° C. and 300° C. In general, the higher the temperature the shorter the time required to achieve a certain strength level. On the other hand at a fixed temperature in general, the core strength increases with time of heating. However, thermal hardening is not a preferred setting process for the compositions of the invention because cores made in this way do not have as good shake-out characteristics as those made by $CO_2$ hardening.

Another fast hardening process that can be used is $CO_2$ gassing in a warm box (about 60° to 80° C.) or gassing with heated $CO_2$.

When fast hardening is not required, cores with the binders of the invention can be set with other common curing agents used for the systems known in the art as silicate no-bakes. These curing agents are organic materials which are latent acids such as ethyl acetate, formamide, and acetins. Most of these agents contain glycerol mono-, di-, or tri-acetates or any other material which can release or decompose into an acid substance which in turn produces hardening of the alkali metal silicate. Furthermore, such a hardening process can produce cores having long shelf life without the need for a film-forming resin adhesive, i.e., polyvinyl acetate.

Conventional water based or alcohol based core washes can be used to treat the surface of the cores. This type of treatment is in some cases to improve the surface of the metal casting or the hardness and shelf life of the core. Shelf life is the period of time after making for which the sand core is useful.

Polyvinyl acetate homopolymers and copolymers can be used as core washes for sand cores as aqueous dispersions, in organic solvent solutions or mixed with zircon or graphite in aqueous or alcoholic suspensions. Polyvinyl alcohol or partially hydrolyzed polyvinyl alcohol can be used in aqueous solutions, organic solvent dispersions or mixed with zircon or graphite.

Polyvinyl alcohol or hydrolyzed polyvinyl acetate: Five percent by weight to 20 percent by weight in water solutions or 5 percent by weight to 40 percent by weight in alcoholic solutions. More concentrated solutions are too thick to obtain uniform coating of the cores, more dilute solutions are too thin to provide satisfactory protective coating on the core surface.

Polymer resin aqueous dispersions and alcoholic solutions: Five percent by weight to 40 percent by weight of polymer resin such as polyvinyl acetate homopolymer or copolymer in water solutions or 5 percent by weight to 25% by weight of polymer resin such as polyvinyl acetate homopolymer or copolymer in alcoholic solutions.

Polymer resin-zircon or graphite mixtures: In water based core washes: 15 to 25 percent by weight of polymer resin such as polyvinyl acetate homopolymer or copolymer and 30 to 50 percent by weight of zircon (25 to 50 percent by weight of water).

In alcohol based core washes: 5 to 10 percent by weight of polymer resin such as polyvinyl acetate homopolymer or copolymer and 30 to 50 percent by weight of zircon or graphite (40 to 60% alcohol).

The alcohols useful in the above core washes include methanol and ethanol.

Satisfactory polymer resin-zircon core washes are made for example by slurrying 1 part by weight of a commercial zircon core wash (as shipped by the supplier in the form of a wet powder) in 1 part by weight of 55% polyvinyl acetate aqueous dispersion if the core wash is intended to be used shortly after preparation. More dilute slurries are preferred for core wash compositions intended to be stored for some time before using. In this case the 1 part by weight of the zircon wet powder should be slurried in 1 part by weight of water before mixing with 1 part by weight of 55% polyvinyl acetate aqueous dispersion.

Aqueous polyvinyl acetate or zircon-polyvinyl acetate or graphite-polyvinyl acetate core washes are applied on the core surface by common foundry practices such as dipping, spraying, brushing, etc., and allowing the core to air dry before using.

Sand cores coated with alcohol base polyvinyl acetate or zircon-polyvinyl acetate are lighted immediately after one wash application as in common foundry practice with alcohol base zircon core washes.

Concentration of polyvinyl alcohol aqueous solutions to give satisfactory core washes with adequate viscosity depends on molecular weight of the polymer. Polyvinyl alcohol solutions can also be used as a mixture with zircon or graphite core wash.

CASTING METALS

Sand molds and cores made with the binder compositions of the invention can be used to cast most metals, such as gray, ductile and malleable iron, steel, aluminum, copper-based alloys such as brass or bronze. Steel is usually cast at around 2900° F., iron at about 2650° F., brass and bronze at around 2100° F. and aluminum at about 1300° F.

With the molds or cores of the invention it is desirable that the core have an initial strength such that it can be handled without undue care and that it will stand up during the casting of the molten metal, i.e., will not wash away or distort. In standard American Foundrymen's Society lab tests this means that the core should have a compressive strength of at least 100 psi and preferably over 150 psi.

It is desirable that the hardness of freshly made cores exceed 5, preferably 10. The greater the hardness, the better, particularly at the time of metal pouring when it should exceed 10 and preferably 20.

Scratch hardness of cured cores can be measured with commercial hardness tester No. 674 available from Harry W. Dietert Co., 9330 Roselawn Avenue, Detroit, Mich. This is a practical, pocket-sized instrument for measuring the surface and sub-surface hardness of baked cores and dry sand molds.

The tester has three abrading points which are loaded by a calibrated spring which exerts a constant pressure. These abrading points are rotated in a circle $\frac{3}{8}$" in diameter. To obtain the hardness values, the lower end of the instrument is held against the sand surface and the abrading points are rotated three revolutions. The hardness values are actually obtained by measuring the depth to which the abrading points penetrate. The maximum hardness value indicated by this tester is 100 for zero penetration. When the abrading points move down a distance of 0.250 inches, the hardness of the core is 0. Intermediate values are read from the instrument dials.

The core should, after the metal has been cast and cooled, have a retained strength such that it can be shaken out without the use of undue energy. This corresponds to a compressive strength in lab tests of, preferably, less than 50 psi.

The following examples are offered to illustrate various embodiments of the invention. All parts and percentages are by weight unless otherwise indicated.

EXAMPLE 1

This is an example of the use of guanidine stabilized sodium polysilicate ($SiO_2/Na_2O$ ratio 5:1) prepared according to Example 1 of patent application Ser. No. 287,037, filed Sept. 7, 1972, as a binder for foundry sand cores. These sand cores were used to make aluminum castings in a nonferrous metal foundry.

The binder sample was made with 1890 g of sodium silicate Du Pont Grade No. 20 ($SiO_2/Na_2O$ molar ratio 3.25:1, 28.4% $SiO_2$, 8.7% $Na_2O$), 56 g of water, 539 g of 1.3 M guanidine hydroxide and 1015 g of Ludox® HS, a commercial colloidal silica sol containing 30% $SiO_2$ of particle size of about 14 nanometers.

The sand mix was prepared in the following way: 90 grams of kaolin and 2 grams of phenolphthalein were added to 10 lbs. of sand while stirring in a 10-lb. capacity Clearfield mixer. 0.5 Lbs. of binder solution were also added to the sand while stirring and the sand was mixed for a total of two minutes.

The sand used was a mixture of 50 parts of Houston's subangular bank sand AFS No. 40–45 and 50 parts of No. 1 Millcreek, Okla. AFS 99 ground sand. The sand when used was at room temperature (75° F.). Humidity of the room was about 80%. The binder mixed readily with the sand showing excellent mixing characteristics. Flowability of the mix was also excellent.

The sand mix was placed in a polyethylene bag and sealed. The sand mix was used the following day to make sand cores. Three to four pound sand cores were made by filling wooden core boxes with the sand mix, compacting the sand by hand and gassing it for about 15–25 seconds with $CO_2$ gas at an estimated pressure of 20–30 pounds.

The color of the sand is deep pink due to the phenolphthalein added. After gassing the cores had the natural color of the original sand. Good release of the core was observed when the core box was opened to remove the core. The cores were immersed in a conventional alcohol zircon core wash and flamed before using. This is common practice with core washes for sodium silicate sand cores.

The cores were assembled in a sand mold and used to make an aluminum casting. Aluminum was poured at a temperature of about 1375° F. When pouring was completed the casting was allowed to cool for about 15 minutes inside the sand mold assembly. The aluminum casting was removed from the mold when still hot and the sand core was observed before shake-out. Shake-out was very easy; the core broke up and flowed like unbonded sand upon touching. No offensive odors were noticed during the casting and cooling.

The aluminum castings had very good surface finish and were used in normal production.

EXAMPLE 2

This is an example of the use of sand cores made with the binder solution of Example 1, to make gray iron castings.

Two 10 lb. sand mix batches were made by adding 0.5 lbs. of the binder solution and 0.7 g of phenolphthalein to 10 lbs. of Houston subangular bank sand AFS 45–50, while stirring in a 10 lb. capacity Clearfield mixer and mixing for two minutes. The binder mixed very well with the sand and gave a uniform sand mix containing 5% of binder by weight of sand. The sand mix showed excellent flowability. The sand mix was kept in a closed polyethylene bag for four hours before using.

Two more 10 lb. sand mix batches were made by adding 23 g of "Nusheen" kaolin powder furnished by the Freeport Kaolin Co., 0.5 lbs. of the binder solution and 0.7 g of phenolphthalein to 10 lbs. of the same Houston sand AFS 45–50, while stirring in a 10 lb. Clearfield mixer, and mixing for two minutes. The kaolin powder and the binder mixed readily with the sand and a uniform sand mix with excellent flowability containing 5% of binder and 0.5% of kaolin by weight of sand was obtained in this manner. The sand mix was kept in a closed polyethylene bag for about four hours before using.

Sand cores were made by placing the sand mixes into a half-bottle shaped aluminum core box with no parting agent, placing iron rods longitudinally in the mix, tapping the sand, and gassing the core with $CO_2$ until the core surface developed enough hardness but the sand still had a light pink color. The gassing was accomplished by placing a $CO_2$ probe for 5 to 10 inches in different parts of the sand core until it was uniformly hardened.

Six core halves with the shape of half-bottles were obtained in this manner and all were dried at 450° F. for one minute. No core wash was applied to the surface of the cores. Two half-bottle shaped parts made with sand mix containing no kaolin were assembled and glued together with a conventional silicate core paste furnished by the M. A. Bell Co. of St. Louis, Mo. under the trade name of "Fast-Dry", to form a bottle-shaped sand core.

Two half-bottle shaped parts made with sand mix containing 0.5% of kaolin by weight of sand were also assembled and glued together with the same core paste to form a second bottle-shaped sand core.

A third bottle-shaped core was made by assembling and pasting together one half-bottle shaped core part prepared with sand containing 0.5% by weight of kaolin and one half-bottle shaped core part prepared with sand containing no kaolin.

Three full bottle-shaped sand cores were obtained in this manner and they were assembled inside a sand mold. Gray iron at about 2650° F. was poured into the mold and allowed to cool for about one hour before removing from the mold. Shake-out of all three cores, with and without kaolin, was very easy: The sand core broke up and flowed out when tapped with an iron bar.

EXAMPLE 3

This is an example of the use of a lithium polysilicate solution as a binder for foundry sand cores. The sand cores made with this binder were used to cast brass metal parts.

The lithium polysilicate solution contained 20 weight percent of silica and 2.1 weight percent of lithium oxide, therefore the $SiO_2/Li_2O$ ratio was 4.8:1. Density of the solution is 9.8 lbs/gal (specific gravity 1.17 g/cc); viscosity 10 cp; pH 11.

The sand mix was prepared by adding 0.1 lb. of "Nusheen" kaolin powder, 2 grams of phenolphthalein powder, and 1 lb. of lithium polysilicate binder solution to 10 lbs. of a sand mixture (50 weight percent Houston sand AFS 50 and 50 weight percent #1 Millcreek, Okla., sand AFS 90) in a 10 lb. Clearfield sand mixer while stirring. The mix was stirred for one minute and a half and 30 grams of a conventional release agent commercially available from the M. A. Bell Co. of St. Louis, Mo., under the trade name of Mabco Release Agent "G", was added while stirring. The mix was stirred for a total time of two minutes.

During the operation it was observed that the binder mixed readily with the sand. The sand mix obtained had very good flowability and it was kept overnight in a closed polyethylene bag before using to make sand cores.

Cores were made by ramming the sand mix with a tamper in a wood core box painted with aluminum paint. $CO_2$ gassing was applied for 5 to 10 seconds from each end of the U shaped cores or through a center hole in the case of cylindrical type cores. When the core boxes were opened, the hard, strong sand cores released without difficulty. The cores were immersed in a conventional zircon-alcohol core wash and flamed before using.

The cores were assembled into sand molds and molten brass was poured at about 2100° F. The metal was allowed to cool to about room temperature. The sand core broke up very easily and flowed from inside the casting without difficulty.

EXAMPLE 4

This is an example of the use of the guanidine stabilized sodium polysilicate ($SiO_2/Na_2O$ ratio 5:1) of Example 1 to make sand cores and test them according to American Foundrymen's Society standard methods.

The sand mix was prepared by adding 30 grams of the binder solution and 100 mg of phenolphthalein powder to 570 g Portage 515 sand. Portage 515 is a sand from Portage, Wis., with an AFS (American Foundrymen's Society) Grain Fineness Number as defined in page 5-8 of the seventh edition (1963) of the AFS Foundry Sand Handbook, of 67-71. In this example the AFS number was 68. Phenolphthalein is added only as an indicator for optimum gassing time with $CO_2$.

The addition of the sodium silicate to the sand was made gradually while the sand was stirred at speed setting 2 in a "Kitchenaid" mixer Hobart K45. The sand was mixed for a total of ten minutes.

AFS standard and specimens for foundry sand mixtures were used for making tests. The specimens are cylindrically shaped and exactly 2 in.±0.001 in. (508 cm) diameter and 2 in.±1/32 in. (5.08 cm) height prepared in a standard sand rammer. The standard sand rammer and the standard procedure to make test specimens are described in sections 4-5 and 4-9 respectively of the above-mentioned Foundry Sand Handbook. In this example 170 g of the sand mixed were used to fall within AFS specimen height specifications after ramming.

AFS standard specimens prepared in this manner were strong enough to be handled and in this case they had a pink color due to the phenolphthalein indicator added to the alkaline mix.

A Dietert $CO_2$ gassing fixture set No. 655 supplied by the Harry W. Dietert Co. of Detroit, Mich. was used to harden the sand specimens by making $CO_2$ gas flow through them at a controlled rate for an optimum period of time. The $CO_2$ setting equipment consists of a pressure reducer and flow meter, and gassing fixtures for the standard 2 inch diameter precision specimen tube where the sand specimen is rammed.

The flow meter is calibrated in terms of gas flow at atmospheric pressure from 0 to 15 liters per minute. A constant gas flow of 3 liters per minute was used and the optimum gassing time of each sand mix was determined by testing a number of cores made at different gassing times. The change of color of the phenolphthalein in the sand during gassing indicated the degree of neutralization reached by the alkaline silicate and could be used as a preliminary guidance to try to estimate the hardening of the sample.

After gassing the compressive strength of the standard sand specimens was measured in a motor driven Dietert No. 400 Universal Sand Strength Machine equipped with a No. 410 high dry strength accessory to increase the range of compression strength to 280 psi.

Evaluation of the shake-out characteristics of the sand cores made with the binder compositions was made with the AFS non-standard Retained Strength test. The standard, hardened-by-gassing, 2"×2" sand specimens were soaked in an electric muffle furnace at 850° C. for 12 minutes in their own atmosphere, then removed from the furnace and allowed to cool to just above room temperature, and tested in the Universal Sand Strength Machine.

Some specimens made with commercial silicates as a comparison sometimes gave strength values higher than 280 psi and were therefore tested in an Instron Machine.

Gassing times and strength values obtained with guanidine stabilized sodium polysilicate bonded AFS 68 Portage 515 sand are given in the Table.

Employing the methods of preparation of the sand mix, forming and hardening the sand core specimen, and testing compression strength given in this Example 4, different binder compositions of the invention were used to make and test sand cores. The binder compositions used are described below. Testing results obtained are included in the Table.

EXAMPLES

A. Kaolin (2% by weight) mixed with the sand before adding the 5% guanidine stabilized sodium polysilicate of this Example 4 and mixing for 2 minutes.
B. 5% Tetramethylammonium hydroxide (TMAH) stabilized sodium polysilicate made according to teachings of U.S. Pat. No. 3,625,722.
C. Kaolin (0.5% by weight) mixed with the sand before adding the T.M.A.H. stabilized sodium polysilicate of Sample B and mixing for 2 minutes.
D. 5% Of sodium polysilicate $SiO_2/Na_2O$ molar ratio 3.75:1 made by dissolving fine colloidal silica powder (HiSil 233) in sodium silicate $SiO_2/Na_2O$ molar ratio 3.25:1.
E. 5% Of sodium polysilicate $SiO_2/Na_2O$ molar ratio 6.5:1 stabilized with copper ethylenediamine hydroxide.
F. 10% Of lithium polysilicate $SiO_2/Li_2O$ molar ratio 4.8:1 made according to the teachings of U.S. Pat. No. 2,668,149.
G. 10% Of potassium polysilicate $SiO_2/K_2O$ molar ratio of 5:1.

TABLE

| Binder | Compressive Strength psi | |
|---|---|---|
| | As Gased | Retained After 850° C. - 12 minutes |
| guanidine stabilized sodium polysilicate | 160 | 10 |
| Example A | 160 | 30 |
| Example B | 190 | 30 |
| Example C | 185 | 30 |
| Example D | 160 | 10 |
| Example E | 200 | 25 |
| Example F | 180 | 10 |
| Example G | 100 | <10 |

EXAMPLE 5

Amorphous silica-sodium silicate binder composition of $SiO_2/Na_2O$ ratio 5:1 can be formed directly on the sand by addition of colloidal silica sol of uniform particle diameter about 14 nm to the sand, mixing, and then adding sodium silicate $SiO_2/Na_2O$ molar ratio 3.25:1 and mixing for two minutes.

14.96 g of Du Pont Ludox® HS-40 (40 w/o $SiO_2$) poured into 745 g of Portage 515 sand in a Hobart K-45 mixer while stirring at speed setting 2. Then adding 40 g of Du Pont sodium silicate grade No. 20 ($SiO_2/Na_2O$ molar ratio 3.25:1) and mixing for 2 more minutes.

Standard AFS 2"×2" samples made by ramming, then gassing for 30 seconds with $CO_2$ at a flow rate of 3 liters/minute have a compressive strength of 200 psi and a retained compressive strength at room temperature after soaking in a furnace at 850° C. for 12 minutes and cooling, of 20 psi.

EXAMPLE 6

Amorphous silica-sodium silicate binder composition of $SiO_2/Na_2O$ ratio 5:1 formed directly on the sand as in Example 5 but using a colloidal silica sol of uniform particle diameter about 25 nm instead of 14 nm, with the same sodium silicate.

12 g of Du Pont Ludox® TM-50 (50 w/o $SiO_2$)
40 g of Du Pont sodium silicate No. 20
748 g of Portage 515 sand
$CO_2$ gassing time = 30 seconds
Compressive strength = 230 psi
Retained strength (850° C.—12 minutes) = 15 psi
Retained strength (1375° C.—12 minutes) = 35 psi

EXAMPLE 7

Amorphous silica-sodium silicate binder composition of $SiO_2/Na_2O$ ratio 5:1 formed directly on the sand as in Example 5 but using a colloidal silica sol of uniform particle diameter about 25 nm instead of 14 nm, and using sodium silicate $SiO_2/Na_2O$ molar ratio 3.75:1 instead of 3.25:1.

6.76 g of Du Pont Ludox® TM-50 (50 w/o $SiO_2$)
40 g of Phila. Quartz Co. sodium silicate grade S 35
753.24 g of Portage 515 sand
$CO_2$ gassing time = 30 seconds
Compressive strength = 180 psi
Retained strength (850° C.—12 minutes) = 15 psi

EXAMPLE 8

Amorphous silica-sodium silicate binder composition made with the same components and using the same forming method directly on the sand as used in Example 5, except that relative amounts of silica sol and sodium silicate are calculated to give a final $SiO_2/Na_2O$ molar ratio 8:1 in the mixture.

32 g of Du Pont Ludox® TM-50
40 g of Du Pont sodium silicate No. 20
728 g of Portage 515 sand
$CO_2$ gassing time = 30 seconds
Compressive strength = 210 psi
Retained strength (850° C.—12 minutes) = 20 psi

EXAMPLE 9

Amorphous silica-sodium silicate binder compositions made by first mixing the colloidal amorphous silica as a paste with the sand, then adding the sodium silicate and mixing for two minutes.

3.61 g of Cab-O-Sil M-5 pyrogenic silica powder mixed with 14.4 g of water made a thick paste which was mixed with 475 g of Portage 515 sand in a Hobart K-45 mixer. To the uniform sand-silica mixture, 25 g of Du Pont sodium silicate No. 20 added and mixed for two minutes.

Standard AFS 2"×2" samples made by ramming, then gassing for 30 seconds with $CO_2$ at a flow rate of 3 liters/minute. Compressive strength measured: 210 psi. Retained strength (850° C.—12 minutes): 15 psi.

EXAMPLE 10

This is an example of the use of an amorphous silica-sodium silicate composition of $SiO_2/Na_2O$ ratio 5:1 as a binder for foundry sand cores, a polyvinyl acetate aqueous dispersion as a co-binder and additive for durability, and pitch as an aid to improve shake-out and casting surface finish.

An amorphous silica-sodium silicate binder composition of $SiO_2/Na_2O$ ratio 5:1 is formed directly on the sand by addition of colloidal silica sol of uniform particle diameter about 15 nm to the sand, mixing, and then adding sodium silicate $SiO_2/Na_2O$ molar ratio 3.25:1 and mixing for an additional period of time.

The sand mix is prepared in the following way: 16 grams of "O" Pitch sold by Ashland Chemical Company of Columbus, Ohio are added to 800 grams of Portage 515 sand supplied by Martin Marietta Aggregates of Rukton, Ill., in a "Kitchen-Aid" Hobart K-45 mixer while stirring at speed setting 2 and mixed thoroughly with the sand.

14.70 Grams of "Ludox" HS-40 colloidal silica sold by E. I. du Pont de Nemours and Company, and 16 grams of Gelva S-55L polyvinyl acetate aqueous dispersion, sold by Monsanto Chemical Company, are mixed in a plastic beaker, added to the sand-pitch mix and mixed in the Hobart mixer for 2 minutes.

Finally, 40 grams of Du Pont sodium silicate grade No. 9 ($SiO_2/Na_2O$ molar ratio 3.25:1) are added and mixed for 2 more minutes.

AFS (American Foundrymen's Society) standard specimens for foundry sand mixtures are made immediately after the mixing is completed, as described in Example 4. The specimens are set by gassing with carbon dioxide using the equipment and procedure of Example 4. Optimum gassing time for the composition of this example is 20 seconds.

Gassed cores are separated in two groups: one group of cores is left untreated, the second group of cores is coated by immersion in various core wash compositions given in Table 2. Cores coated with water based and methanol based core washes are allowed to air dry, whereas cores coated with ethanol based core washes are lighted immediately after removal from the core wash bath and the flame is allowed to extinguish.

The compressive strength of the standard sand specimens is measured as described in Example 4. Tensile strength is determined by making AFS standard briquets, gassing with $CO_2$ for 20 seconds and testing the briquets according to the standard AFS method (Briquet Method).

Surface (and sub-surface) hardness of the cores is measured with a Dietert-Detroit Core Hardness Tester No. 674.

Shelf life of the cores is evaluated by measuring core scratch hardness, compressive strength and in some cases tensile strength of cores stored in standard temperature-humidity condition as a function of elasped time of storage.

The compressive strength, tensile strength, and core scratch hardness obtained are given in Tables 1 and 2.

Evaluation of the shake-out characteristics of the sand cores made with the binder compositions is made with the AFS nonstandard Retained Strength test. The standard, hardened-by-gassing, 2"×2" sand specimens are soaked in an electric muffle furnace at 850° C. or 1375° C. for 12 minutes in their own atmosphere, then removed from the furnace and allowed to cool to just above room temperature, and tested in the Universal Sand Strength Machine. For all cores prepared as described in this example, both 850° C. and 1375° C. retained strength values were less than 25 psi.

Some specimens made with commercial silicates as a comparison sometimes give retained strength values higher than 280 psi and are therefore tested on an Instron Machine.

TABLE 1

EXAMPLE 10

Mechanical properties versus elapsed time on storage at 73° F. ± 2° F. and 50% relative humidity of Portage 515 sand cores made with 5% sodium silicate*- 1.94% silica sol - 2% polyvinyl acetate aqueous dispersion* - 2% pitch****

| Core Mechanical Properties | Properties As Made | Elapsed Time Since Making Core | | | | |
|---|---|---|---|---|---|---|
| | | 1 day | 2 days | 3 days | one week | one month |
| Compressive Strength, psi | 165 | 180 | 200 | 260 | 260 | 275 |
| Core (Scratch) Hardness | 30 | 40 | 45 | 45 | 45 | 45 |
| Tensile Strength, psi | 25 | 25 | 40 | 45 | 45 | 45 |

*Du Pont Sodium Silicate No. 9: 29 w/o $SiO_2$; 8.9 w/o $Na_2O$.
**Du Pont Ludox ® HS-40: 40 w/o $SiO_2$.
***Monsanto Gelva S-55L: 55 w/o polyvinyl acetate.
****Ashland Chemical "O" Pitch powder.

TABLE 2

EXAMPLE 10

Compressive strength and core hardness versus elapsed time on storage at 73° F. ± 2° F. and 50% relative humidity of Portage 515 sand cores made with 5% sodium silicate- 1.94% silica sol - 2% polyvinyl acetate aqueous dispersion - 2% pitch uncoated and coated with various core washes (grades of binder components in Table 1)

| Core Wash | Core Properties | Properties As Made | Time Elapsed on Storage | | | | |
|---|---|---|---|---|---|---|---|
| | | | 1 day | 2 days | 3 days | one week | one month |
| No core wash | C.S.* | 165 | 180 | 200 | 260 | 260 | 275 |
| | Hardness* | 30 | 40 | 45 | 45 | 45 | 45 |
| Polyvinyl acetate water based core wash (75% Monsanto Gelva S-55L in water) | Compr. Str. Hardness | 150 90 | 90 | 280 90 | 90 | 90 | 90 |
| Commercial zircon core wash (50% "Lite-Off" A ethanol dispersion)*** | C.S. Hardness | 170 60 | | 65 | >280 | | 335 60 |
| Commercial graphite core wash (50% Pyrokote**** ethanol dispersion) | C.S. Hardness | 170 55 | | 75 | >280 | | 75 |
| Polyvinyl acetate alcohol based core wash (75% Monsanto Gelva V7-M50 in methanol) | C.S. Hardness | 170 >100 | | | >280 >100 | >335 | >100 |
| Polyvinyl acetate-zircon water based core wash (1 part Gelva S-55L, 1 part Lite-Off A, 1 part water) | C.S. Hardness | 130 30 | | | | 280 100 | |

*C.S. Compressive Strength, psi. American Foundrymen's Society Standard Method for Bulked Cores.
**Hardness. Core (Scratch) Hardness.
***Lite-Off A is a product of M.A. Bell Co., St. Louis, Mo.
****Pyrokote Supreme 114-6X supplied by Penna. Foundry Supply and Sand Co., Philadelphia, Pennsylvania.

EXAMPLE 11

This examples describes the preparation of sand cores bonded with amorphous silica, sodium silicate and polyvinyl acetate and their use in casting 2.5" grey iron and brass pipe tees. The sand mix is prepared in a Carver "S" mixer by adding to 400 lbs. of sand (Whitehead Brothers "E" sand with an AFS number 92.2), a mixture consisting of 10.5 lbs. Du Pont "Ludox" HS-40 and 9 lbs. Monsanto Gelva S-55L polyvinyl acetate aqueous dispersion, and 9 lbs. of pitch (Ashland Chemicals "O" Grade). After five minutes 27 lbs. of Du Pont No. 9 sodium silicate are added and mixing is continued for a further five minutes. The free flowing, uniformly brown mix is then discharged to a storage bin.

The cores are formed by air blowing the mix into a steel pattern comprising twin 2⅛" tees and gassing with carbon dioxide at 65 psi for 3.5 seconds. The cores are immediately removed from the pattern and placed on storage trays. 150 cores are made in 18 minutes, each weighing about 2¼ lbs. No fumes or odors are detected during the mixing or core preparation and the cores have adequate strength for normal handling in the foundry. They have a very smooth surface with an AFS hardness number of about 20. The cores are positioned in oil bonded sand molds, enclosed by steel boxes and grey iron is poured at about 2700° F. Ninety cores are used within a few hours of preparation and 58 are stored for three days at relative humidity of about 25% at about 18° C. The cores which are stored for three days are both stronger and harder than when first made.

After pouring the iron the cores are cooled almost to room temperature. No offensive odors are detected during metal pouring or cooling. The cores are then very weak and shake-out readily with excellent surface peel from the iron. After final cleanup by wet drum tumbling and shot blasting, the pipe tees have a much smoother internal surface than those made in normal production using a commercial, proprietary silicate binder. In addition to having a rougher surface some of the tees made using cores with the commercial binder still had sand adhering to the internal surface after cleanup.

Two of the cores prepared as described above are coated by brushing on a slurry consisting of 50% zircon and 20% polyvinyl acetate methanolic dispersion (Monsanto Gelva V7-M50) and 30% methanol. The alcohol is allowed to air dry leaving a hard coating of zircon bonded with polyvinyl acetate. The hardness is measured as 90 AFS and shows no change after storing for three days at about 25% relative humidity and about 18° C.

The cores are positioned in molds, and brass is poured at 2120° F. After cooling to room temperature the cores collapse readily and shake-out is easily accomplished with excellent peel from the metal surface. No offensive fumes are detected during metal pouring and cooling. The internal surface of the brass tees is very clean and smooth.

EXAMPLE 12

The procedure of Example 11 is repeated using Houston, subangular bank sand, AFS number 45, and omitting the pitch. Half of the cores are coated by immersing them in an agitated slurry containing 50% graphite (Pyrokote), 10% Monsanto Gelva S-55L polyvinyl acetate, and 40% alcohol, allowing them to drain and igniting the alcohol to burn off completely. The other half are similarly treated with an aqueous slurry containing 75% Monsanto (Gelva S-55L) polyvinyl acetate dispersion, allowing them to drain and air dry.

After storing for two weeks at about 80% relative humidity and 30° C. all the cores are strong and hard (AFS hardness number 80-90). The cores are positioned in the molds and brass is poured at 2150° F. and allowed to cool to about room temperature. No offensive fumes are detected during metal pouring and cooling. Core breakdown is very easy in all cases and the shake-out sand is granular and free flowing. Surface peel and internal surface finish are excellent in the case of tees made from cores treated with the graphite polyvinyl acetate wash and very good for cores coated with polyvinyl acetate alone. No sand residues are observed on the internal surfaces of tees cast from any of the cores.

EXAMPLE 13

This example describes the preparation of sand cores bonded with colloidal silica powder, sodium silicate and polyvinyl acetate ethylene copolymer and their use in the production of cast iron end plates for boilers.

Two thousand pounds of Portage No. 515 sand, AFS number 68 are charged to a batch muller. Forty pounds of pitch (Ashland Chemical Co. "O" grade) are thoroughly mixed with the sand over a period of three minutes. Twenty pounds of Cab-O-Sil M-5 pyrogenic silica powder, as a thick paste with 80 pounds of water, and 40 pounds of Du Pont's "Elvace" 1873, a 55% aqueous dispersion of polyvinyl acetate/ethylene copolymer (13% ethylene) are then added to the mulled mixture over a period of two minutes. One hundred six pounds of Du Pont No. 20 sodium silicate are then added and the mixing continued for an additional two minutes. Half a minute from the end of the mixing period, 1.5 pounds of M. A. Bell's "G" grade flow agent are added. The free flowing mix is discharged into a bin. Cores are made by hand ramming the mix into the two halves of a split core box. The two halves are clamped together and the core is gassed with carbon dioxide at 30 psi for a period of 30 seconds. No fumes or odors are detected during mixing and core preparation. The core is then stripped from the pattern and after storing for several days at about 50% humidity and 25° C. it is assembled in the mold. Iron is poured at 2650° F. and after cooling to about 1500° F. the molds are broken away. Examination of the cores shows them to be quite friable and they collapse immediately on a vibrator table and shake-out as granular lump free sand. The boiler end plates are free from defects, dimensionally accurate and have excellent surface finish.

EXAMPLE 14

This is an example of the use of esters as setting agents for the high ratio silicate binders of this invention.

The sand mix is prepared by mixing 14.7 grams of "Ludox" HS-40 and 2 grams of Triacetin (glycerol triacetate sold by Eastman Kodak), with 760 grams of Portage 515 sand using a "Kitchen-Aid" mixer, Hobart K45. The sand is mixed for a total of 2 minutes and 40 grams of sodium silicate ratio 3.25 (Du Pont No. 9) are then added. After an additional 2 minutes mixing the free flowing sand mix is used immediately to prepare standard 2" diameter cylinders as described in Example 4. Cores are similarly made using 2 grams of ethyl acetate (ACS grade sold by Fisher Scientific Co.) in place of Triacetin. Cores are stored at 73° F. and 50% relative humidity. The compressive strength, hardness and shake-out characteristics are evaluated as described in Example 4 and the results are tabulated in Table 1.

In addition to very good initial strength and hardness, both strength and hardness increase on storage and the loss of strength after heating the cores for 12 minutes at 850° C. is indicative of good shake-out.

TABLE 1

EXAMPLE 14

Mechanical properties versus elapsed time on storage at 73° F. and 50% relative humidity of Portage 515 sand cores made with 5.3% sodium silicate* - 1.93% silica sol and either 0.26% Triacetin* or 0.26% ethyl acetate****

| Mechanical Properties | | 1 day | 3 days | 5 days | one week | After Heating 850° C. for 12 min. |
|---|---|---|---|---|---|---|
| Compressive | Triacetin | | 570 | 685 | | 90 |
| Strength, psi | Ethyl acetate | 260 | | | 685 | 100 |
| Core (Scratch) | Triacetin | | 80 | 85 | | |
| Hardness | Ethyl acetate | 98 | | | 90 | |

*Du Pont Sodium Silicate No. 9: 29 w/o SiO$_2$; 8.9 w/o Na$_2$O.
**DU Pont Ludox ® HS-40: 40 w/o SiO$_2$.
***Eastman Kodak glycerol triacetate.
****Fisher Scientific Co. ACS grade ethyl acetate.

A 400 pound sand mix is made in a Carver "S" mixer as described in Example 11 adding 8 pounds of pitch in addition to "Ludox" HS-40, sodium silicate No. 9 and Triacetin at the same levels on the sand as described above. Cores for 2½" pipe tees are made as described in Example 11 except that the cores are not gassed with CO$_2$. After allowing them to harden in the pattern for 5 minutes the pattern is stripped and the cores are stored for three days before being assembled in the molds. Ductile iron is poured at about 2700° C. and the castings are allowed to cool for about two hours inside the mold assembly. After removing the castings from the molds the cores collapse readily in a vibrator and the recovered sand is granular and free from lumps. No odors are produced during the entire operation and the castings have very good interior surface finish.

EXAMPLE 15

This is an example of heat setting the high ratio sodium silicate binder of this invention.

A sand mix is prepared in a Hobart K45 mixer by adding 12 grams of "Ludox" TM-50, 16 grams of polyvinyl acetate dispersion (Monsanto Gelva S-55L) and 40 grams of sodium silicate ratio 3.25 Du Pont No. 9) to 750 grams of Portage 515 sand. The mixing time is ten minutes and the free flowing mix is used to prepare standard 2" diameter cylinders as described in Example 4. The cores are carefully removed from the compacting cylinder and heated for 1 hour in an air oven at 100° C. The strength and hardness of the cured cores are as follows:

| Compressive strength | = 1200 psi |
|---|---|
| AFS Hardness | = 95 |
| Retained strength (850° C. - 12 minutes) | = 150 psi |

EXAMPLE 16

This is an example of the use of dextrin with high ratio sodium silicate binder to produce cores which retain excellent strength and hardness when stored for several weeks.

A sand mix is prepared as described in Example 14 by mixing 14.7 grams "Ludox" HS-40, 16 grams of 50% aqueous solution of dextrin (sold by Industrial Products Chemicals, Pikesville, Md.) previously mixed with 40 grams of sodium silicate ratio 3.25 (Du Pont No. 9), with 760 grams of Portage 515 sand. Standard cores are prepared and set by gassing with carbon dioxide as described in Example 4. Compressive strength and hardness measurements when freshly made and after storing for one week at about 50% relative humidity and 23° C. show these cores to have excellent storage life. Loss of strength after heating for 12 minutes at 850° C. and 1375° C. in indicative of good shake-out.

| | Initial | After One Week |
|---|---|---|
| Compressive Strength, psi | 135 | 150 |
| Core (Scratch) Hardness | 30 | 50 |
| Retained Strength (850° C.-12 min.), psi | | 20 |
| Retained Strength (1375° C.-12 min.), psi | | 50 |

EXAMPLE 17

Amorphous silica-sodium silicate-polyvinyl acetate of SiO$_2$/Na$_2$O molar ratio 5:1 formed directly on the sand by addition of a uniform, stable mixture of aqueous silica sol of uniform particle diameter about 12 nanometers to the sand, mixing and then adding sodium silicate SiO$_2$/Na$_2$O molar ratio 3.25:1 and mixing for two minutes.

14.96 grams of Du Pont "Ludox" HS-40 (40 w/o SiO$_2$) are mixed in a beaker with 16 g. of Monsanto Gelva S-55L polyvinyl acetate aqueous dispersion (55 w/o polyvinyl acetate) and poured into 740 g. of Portage 515 sand in a Hobart "Kitchen-Aid" K45 mixer, stirred at speed setting 2 for two minutes. Then adding 40 g. of Du Pont sodium silicate grade No. 9 (29 w/o SiO$_2$, 8.9 w/o Na$_2$O) and mixing for 2 more minutes.

Standard AFS 2"×2" samples made by ramming, then gassing for 20 seconds with CO$_2$ at a flow rate of 5 liters/minute, are allowed to age at about 23° C. and 50% humidity, others are immersed in polyvinyl acetate or polyvinyl acetate-zircon water-based core washes and allowed to air dry. Samples treated with core washes are allowed to age under the same conditions as the untreated specimens. Compressive strength and core scratch hardness, and in some cases tensile strength is determined the day of making the cores and after several periods of time.

Results obtained are shown on the table.

EXAMPLE 17

Mechanical properties versus elapsed time on storage at 73° F. ± 2° F. and 50% relative humidity of Portage 515 sand cores made with 5% sodium silicate - 1.94% silica sol- 2% polyvinyl acetate aqueous dispersion uncoated and coated with various core washes

| Core Wash | Mechanical Properties | As Made | 1 day | 2 days | 3 days | one week | two weeks | one month |
|---|---|---|---|---|---|---|---|---|
| No core wash | Compressive Strength, psi | 170 | 170 | 180 | 200 | 260 | 300 | |
| | Tensile Strength, psi | 30 | 40 | 50 | 55 | 60 | | |
| | Core Scratch Hardness | 35 | 50 | 50 | 50 | 50 | | |
| Polyvinyl acetate-zircon water-based core wash (1 part Monsanto Gelva S-55L; 1 part "Lite-Off" A; 1 part water) | Compressive Strength | 150 | | | 290 | | 440 | |
| | Hardness | 25 | 95 | | | 95 | | 95 |
| Polyvinyl acetate-zircon alcohol-based core wash (1.0 parts Gelva V7-50 diluted with methanol to 20% polyvinyl acetate; 1 part "Lite-Off" A) | C.S. | 170 | | | 425 | | | 450 |
| | Hardness | | | | 100 | | | 100 |
| Polyvinyl acetate water-based core wash (75% Gelva S-55L in H₂O) | C.S. | 170 | | | 275 | | | 315 |
| | Tensile | 25 | | | · | 60 | | 140 |
| | Hardness | 100 | | | | 100 | 100 | |
| Polyvinyl acetate alcohol-based core wash (75% Gelva V7-M50 in methanol) | C.S. | | | | 320 | | | 395 |
| | Hardness | | | | 100 | | | 100 |

What is claimed is:

1. A stable binder component composition consisting essentially of (a) 95 to 99½% by weight of an aqueous binder comprising an aqueous sodium, potassium or lithium silicate solution or mixtures thereof and amorphous silica, the amorphous silica in the silicate solution determined by the gore test procedure, the binder characterized by (1) a molar ratio of silica to alkali metal oxide of from 3.5:1 to 10:1; (2) a weight fraction of the total silica present as amorphous silica is from 2 to 50%; (3) a weight fraction of the total silica present as silicate ions is from 98 to 50% and the amorphous silica has a particle size of from 2 nanometers to 500 nanometers and (b) ½ to 5% by weight of a suspending agent system comprising (1) carboxymethyl cellulose and (2) carboxyvinyl polymer in a total amount of about 36 to 65% by weight with the relative amount of (1) to (2) ranging from a weight ratio of about 1:4 to 4:1 and (3) magnesium montmorillonite clay in a concentration of about 35 to 64% by weight, said aqueous binder having 15 to 35% by weight silica solids.

2. The stable binder of claim 1 wherein there is also present 15 to 35% by weight solids of a film-forming resin adhesive with the binder having a total solids content maximum of 55% by weight.

3. The stable binder of claim 1 wherein the silica solids are 5 to 20% by weight and additionally there are present 5 to 20% by weight total solids of a film-forming resin adhesive and 5 to 40% by weight total solids of a carbonaceous material with the binder having a total solids content of a maximum of 55% by weight.

4. The composition of claim 2 wherein the film-forming resin adhesive is polyvinyl acetate.

5. The composition of claim 2 wherein the film-forming resin adhesive is polyvinyl acetate.

6. The composition of claim 3 wherein the film-forming resin adhesive is polyvinyl acetate and the carbonaceous material is pitch.

7. The stable binder of claim 1 wherein the molar ratio is from 4:1 to 6:1, the weight fraction of the total silica as amorphous silica is from 10 to 50%, the fraction of total silica as silicate ions is from 90 to 50% and the amorphous silica has a particle size of from 12 to 60 nanometers.

8. The stable binder of claim 1 wherein the weight fraction of the total silica as amorphous silica is from 30 to 50% and the weight fraction of the total silica present as silicate ions is from 70 to 50%.

9. The stable binder of claim 1 wherein the silicate is sodium silicate.

* * * * *